(12) United States Patent
Howard

(10) Patent No.: US 6,621,179 B1
(45) Date of Patent: Sep. 16, 2003

(54) DEVICE FOR CURTAILING ELECTRIC DEMAND

(76) Inventor: John E. Howard, 1559 Spinnaker Dr. #201, Ventura, CA (US) 93001

( * ) Notice: Subject to any disclaimer, the term of this patent is extended or adjusted under 35 U.S.C. 154(b) by 0 days.

(21) Appl. No.: 10/116,290

(22) Filed: Apr. 3, 2002

Related U.S. Application Data

(60) Provisional application No. 60/282,126, filed on Apr. 5, 2001.

(51) Int. Cl.[7] .................................................. H02J 1/00
(52) U.S. Cl. ............................. 307/38; 307/29; 307/31; 307/35
(58) Field of Search .............................. 307/35, 39, 38, 307/31, 29; 340/870, 310, 825; 364/492; 700/235

(56) References Cited

U.S. PATENT DOCUMENTS 4,819,180 A  *  4/1989  Hedman et al. ............ 700/291
5,923,269 A  *  7/1999  Shuey et al. ........... 340/870.02
6,157,874 A  * 12/2000  Cooley et al. .............. 700/295
6,285,296 B1 *  9/2001  Christie ................. 340/825.69

* cited by examiner

*Primary Examiner*—Brian Sircus
*Assistant Examiner*—Robert L DeBeradinis

(57) ABSTRACT

A device for curtailing electric demand is suitable as a tool for responding to the real-time pricing of electrical energy or for reducing demand during power shortages. The device (104) according to the present invention works in conjunction with an energy management system (40), which receives demand signals from an electric meter (24). Upon executing a curtailment command sent to the device (104) through a communications network (48, 50, 102), device intercepts and biases the signal going to the energy management system (40), which, in effect, coerces it to reduce the demand upon the meter (24) and upon the electric grid (20).

3 Claims, 5 Drawing Sheets

DEVICE FOR CURTAILING ELECTRIC DEMAND

This application claims the benefit of provisional application No. 60/282,126, filed Apr. 5, 2001.

FEDERALLY SPONSORED RESEARCH

Not Applicable

SEQUENCE LISTING OR PROGRAM

Not Applicable

BACKGROUND—FIELD OF INVENTION

The field of the invention relates generally to the utilization of electric power, and specifically to a device that can remotely curtail the electric demand of a premises during supply shortages and periods of high power prices.

BACKGROUND—DESCRIPTION OF PRIOR ART

The two primary components of electric bills are energy charges and demand charges. Energy is the amount of the commodity of electricity consumed, and it is measured in kilowatt-hours (kWh). Demand is the rate (that is, the pace) at which energy is consumed, and it is measured in kilowatts (kW). Demand charges are computed from the largest average demand of a sequence of equal time intervals, usually 15 minutes long. Both energy charges and demand charges can vary by time of use.

Deregulation of the electric utility industry has been accompanied by the emergence of spot markets for electric power and access to those markets by utility customers. Since electricity cannot be stored on a large scale, energy prices tend to be highly dynamic over time scales as short as a day. Most markets post prices hourly, every 15 minutes, or even oftener. Some electric suppliers have implemented Real-Time Pricing (RTP) under which prices are posted when, or shortly before, they become effective. Under RTP customers can reduce their electric bills by shifting usage from periods of higher to lower prices. This strategy has three prerequisites: (1) a method to communicate energy prices (2) ability to control the customer's lighting and electric equipment so as to shift or curtail usage, and (3) a method of verifying the response, usually by employing a so-called interval meter that records electric usage as a function of time. RTP has a secondary benefit in that price response on a large scale can take some of the pressure off the power markets and reduce price volatility.

For many years utilities have offered interruptible electric rates, which provide a discount in return for customers agreeing to interrupt service during power shortages. The shortage may arise suddenly if a large generating unit breaks down, and action must be taken within minutes to prevent the collapse of the power grid in an entire region. After a decade or more without an incident, interruptible rates were put to the test in California during the power shortages of the summer of 2000 and the following winter. Many interruptible customers elected to pay stiff penalties rather than shutting down their facilities. Customers who did shut down sent thousands of workers home, lost production and incurred significant economic losses. Utilities also implemented rolling blackouts during this period. Curtailment, that is, an orderly, predictable demand reduction is more palatable and less disruptive than these drastic measures.

Commercial and industrial utility customers have embraced the energy management system (EMS) as an effective way to lower their electric bills. Most of the systems in service work autonomously and limit demand. They sense demand in one of several ways. Most commonly, the electric meter is fitted with an accessory that produces pulses, which are called "KYZ" pulses by the electric utility industry. A pulse is sent each time a certain amount of energy is metered, and the rate at which the meter sends pulses represents the current demand. When the demand (that is, the pulse frequency) exceeds a programmed limit, the EMS responds by switching off one or more pieces of equipment and/or changing process set points. An example of the latter is that an EMS would turn a thermostat a few degrees higher on a hot afternoon to curtail the power consumed by an air conditioning system. The electric meter may instead communicate demand in the form of an analog signal or serial data, but the principle remains the same.

In concept it is possible to develop a device that reprograms an EMS dynamically in response to RTP rates or to curtail demand. There are many types of EMSs, and they employ many different programming languages and communication protocols. Electric rate structures vary from one locale to the next. Most importantly, each EMS is programmed individually for the particular equipment and premises it serves. Therefore, each such device would have to be custom-programmed for each EMS, and the associated cost would be restrictive, if not prohibitive.

Many types of EMSs have been developed, and they are in widespread use. U.S. Pat. No. 4,324,987 to Sullivan, II, et al. (1982) describes an autonomous EMS that limits demand by controlling discrete electric loads. However, this system and the vast majority of EMS designs in service today have no communication pathway that enables either RTP response or remote curtailment capability.

U.S. Pat. No. 6,327,541 to Pitchford, et al. (2001) provides centralized access to electric usage data from a multitude of locations. While the patent is entitled "Energy Management System", the claims do not cover the control of energy end-uses.

U.S. Pat. No. 5,502,339 to Hartig (1996) describes an EMS that controls end-uses. In concept, it can curtail demand and respond to RTP, but it accomplishes this by the slow and awkward procedure of reprogramming the EMS over a telephone line. The method described is not practical for thousands of customers who may have to respond in a timeframe of minutes.

U.S. Pat. No. 5,572,438 to Ehlers, et al. (1996) describes an EMS that is accessible and controllable from a central location. Conceivably the EMS could provide price response, but the claims don't cover this capability. Implementing this system would require the installation of a sophisticated controller, as well as control hardware in each branch circuit to be controlled. In other words, this patent describes an entire EMS, which would be expensive, although it would provide functionality and potential cost savings beyond the typical, autonomous EMS. U.S. Pat. No.

5,696,695 also to Ehlers, et al. (1997) describes explicitly an EMS that is responsive to energy prices. As in the previous case, implementing this system would require installation of an entire EMS at substantial cost.

U.S. Patent Application 20020019758 by Scarpelli (2002) describes a "load management dispatch system and method" and presents some 61 independent and dependent claims for "methods" and "systems." The only claim that relates to control of end-uses is (dependent) claim 58, which states: "the signal is operative to automatically initiate a load curtailment by the energy consumer." The specification adds no specificity to the embodiment of "load curtailment." The broad description in the cited application is ripe for the development of well-defined, workable inventions that incorporate control of end-uses. If one assumes the embodiment of Scarpelli's application includes a full EMS, significant cost will be incurred to implement it and to establish the required communication pathways.

U.S. Pat. No. 4,819,180 by Hedman, et al. (1989) describes a method and system for regulating power delivered to commercial or residential users. When the electric utility transmits a control signal to a user, a variable limit demand controller modifies the power consumed by the user. It does so by modifying a stored demand limit and switching electric loads on or off to attain the modified demand limit. While it is possible to implement Hedman in the stocks of existing EMSs, doing so would require that each EMS involved be individually reprogrammed to modify and seek the modified demand limit during curtailment events. If large numbers of EMSs are involved, reprogramming becomes a daunting and costly task due to the many different protocols, programming languages, program structures, and physical programming interfaces that must be dealt with. Further complicating this task is that each facility has its own mix of electrical loads and control requirements.

Hedman discloses a utility control signal that is binary-on or off, and a single percentage demand reduction that resides in the controller's non-volatile memory. Thus, Hedman is limited to curtailing by a fixed percentage, unless the memory is reprogrammed at the site.

The salient question is how to cost-effectively tap the potential of the existing stock of EMSs, which control a significant amount of demand grid-wide. If this can be done cost-effectively, these EMSs can be employed to provide RTP response for individual customers, as well as grid-wide demand curtailment during supply shortages. Prior art does not provide the answer.

Objects and Advantages

The device for curtailing electric demand provides customers who utilize energy management systems (EMSs) a cost-effective method of responding to real-time pricing (RTP) of energy. Furthermore, the device allows the customer to be curtailed within one minute of sending a command from a central location. Widespread implementation of the device can mitigate the need for disruptive rolling blackouts and power interruptions.

Prior art can provide these capabilities by installing a complete, state-of-the-art EMS. This will generally incorporate a sophisticated controller, which may have hundreds of inputs and outputs, a local network, cabling, and numerous load control components such as relays, starters, circuit breakers, contactors, etc. Furthermore, the new EMS must be programmed for the specific facility, and for the particular curtailment and RTP response strategies to be employed.

The key to the cost-effectiveness of the device for curtailing electric demand is that it provides these capabilities by harnessing the intelligence of existing EMSs. Furthermore, the device utilizes existing infrastructure to provide a low-cost communications pathway for EMSs lacking that feature. In contrast to prior art, the device is a relatively simple and is much lower in cost. Furthermore, the device's unique principle of biasing the demand signal to the EMS takes advantage of the existing programming in the EMS, and eliminates the need for costly reprogramming. Therefore, the costs of new hardware and installation are minimized.

A wireless pager service provides a viable communication pathway for the device for curtailing electric demand, so no wiring to an external network is required, nor is a local network. The content of the curtailment commands is simple and direct, consisting of a curtailment level, a start time, a stop time, and an address. Certain pagers and paging services can handle broadcast messages, permitting large numbers of customers to be curtailed by a single command. This capability makes the device especially suitable for use during supply shortages when many customers must be curtailed quickly. Still further objects and advantages will become apparent from a consideration of the ensuing description and drawings.

SUMMARY

The device for curtailing electric demand is suitable as a tool for responding to the real-time pricing of electrical energy, or for reducing demand during power shortages. Typically, a computer in a central location would issue curtailment commands to the device through a wireless communications network, but a wireline or optical network could be used instead. The device works in conjunction with an energy management system (EMS), which receives demand signals from an electric meter. In common practice, EMSs are programmed to limit electric demand, and the device takes advantage of that strategy. Upon executing a curtailment command, the device intercepts and biases the signal going to the EMS, which, in effect, coerces the EMS to reduce the demand upon the meter, and upon the electric grid.

DRAWINGS

In the drawings, prior art elements bear reference numbers less than 100, and elements of the embodiment of device for curtailing electric demand bear reference numbers of 100 and greater. In the drawings.

Figure 1:
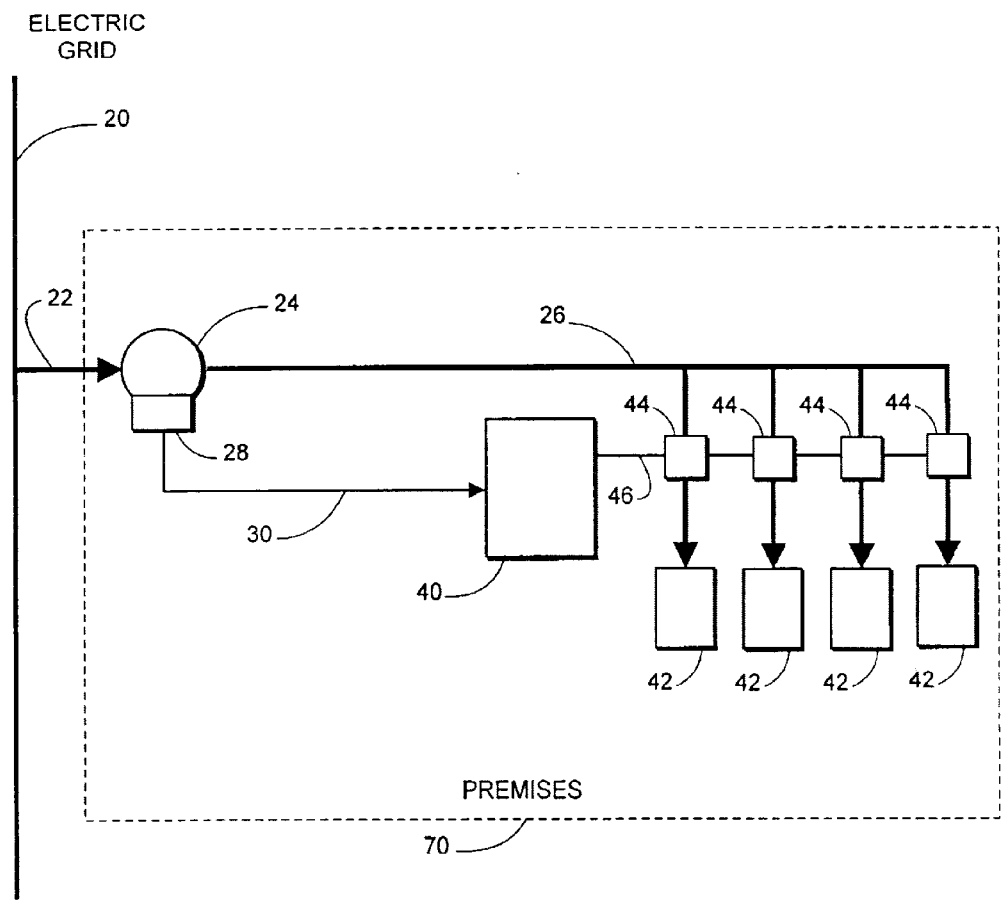
FIG. 1 is a block diagram showing the application of an energy management system (EMS) according to certain of the prior art.

| | Reference Numerals In Drawings | | |
|---|---|---|---|
| 20 | electric grid | 22 | electric service |
| 24 | electric meter | 26 | branch circuits |
| 28 | pulse output | 30 | pulse signal connection |
| 30A | input pulse signal connection | 30B | output pulse signal connection |
| 40 | energy management system | 42 | electric end-use device (a plurality) |
| 44 | control component (a plurality) | 46 | signal network |
| 48 | Internet | 50 | cellular station |
| 70 | premises | 100 | command computer |
| 104 | curtailment device | 102 | wireless signal |
| 106 | wireless transceiver | 120 | microcontroller |
| 122 | first signal conditioning circuit | 124 | second signal conditioning circuit |
| 126 | first buffer circuit | 128 | second buffer circuit |
| 130 | third buffer circuit | 132 | fourth buffer circuit |
| 134 | relay | 136 | coil |
| 140 | user alert accessory | 142 | alert signal cable |
| 144 | serial connection | 146 | audible alarm |
| 148 | pushbutton switch | 150 | lamp |
| 152 | power supply | 154 | alternating current source |
| 200 | pulse waveform in input pulse signal connection, with no curtailment | 202 | pulse waveform in output pulse signal connection, with no curtailment |
| 206 | pulse waveform in output pulse signal connection, with curtailment | 204 | pulse waveform in input pulse signal connection, with curtailment |

DESCRIPTION—PREFERRED EMBODIMENT

The description that follows is intended to be exemplary, and not limiting. FIG. 1 is a block diagram showing the application of a typical energy management system (EMS). This diagram represents certain implementations of prior art, particularly those that are suitable for installation of the device for curtailing electric demand of the present invention. An electric grid 20 supplies power to a premises 70 though an electric service 22. An electric meter 24 measures the quantity of electrical energy consumed in premises 70. A plurality of branch circuits 26 distributes electrical energy throughout premises 70 to a plurality of electric end-use devices 42. An energy management system (EMS) 40 communicates through a signal network 48 to a plurality of control components 44, each of which can activate, deactivate, or modulate the connected electric end-use device 42. Electric meter 24 incorporates a pulse output 28, which is connected to EMS 40 by a pulse signal connection 30.

Figure 2:
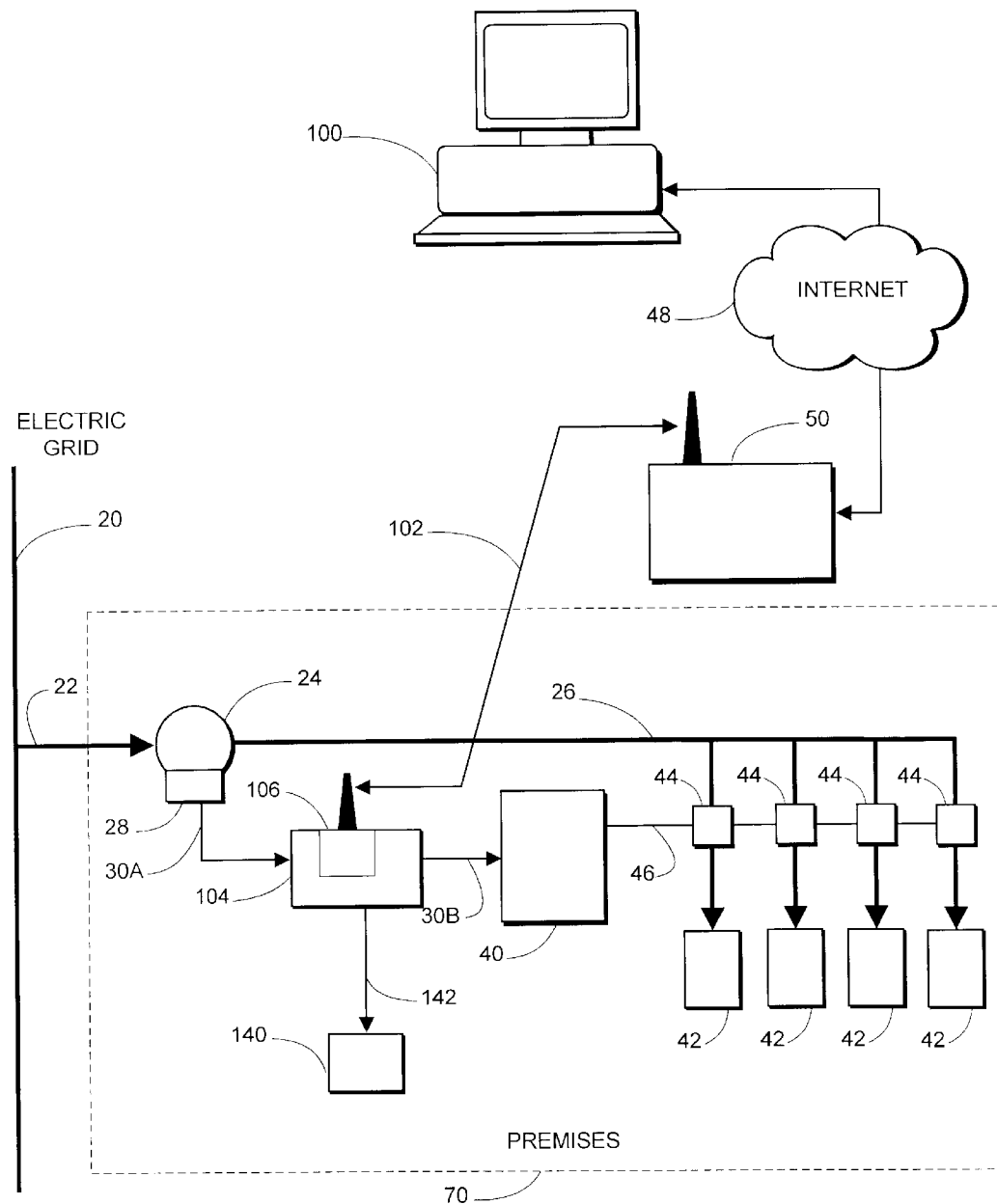
FIG. 2 is a block diagram showing the application of a typical EMS, with the device for curtailing electric demand according to the present invention, and an associated communications network.

FIG. 2 is a block diagram showing the application of a typical EMS, with the addition of the device for curtailing electric demand according to the present invention and an associated communications network. The elements added within premises 70 are a curtailment device 104 with an embedded wireless transceiver 106, a user alert accessory 140, an alert signal cable 142. The pulse signal connection 30 of FIG. 1 is replaced in FIG. 2 by two segments. An input pulse signal connection 30A connects the pulse output 28 with the curtailment device 104. An output pulse signal connection 30B connects curtailment device 104 to EMS 40. The communication elements shown in FIG. 2 and associated with the device for curtailing electric demand are a command computer 100, a communications network generally known as the Internet 48, a wireless signal 102, and a wireless service provider's cellular station 50.

A candidate for the wireless transceiver is the Motorola CreateaLink® 2XT two-way pager. Skytel, a division of MCI Communications, provides wireless service for this pager. Two-way communications are desirable for the purpose of verifying that a curtailment command has been received and carried out. One candidate for microcontroller 120 would be the type PIC16C66, manufactured by Microchip Technologies, Inc. of Chandler, Ariz.

Figure 3:
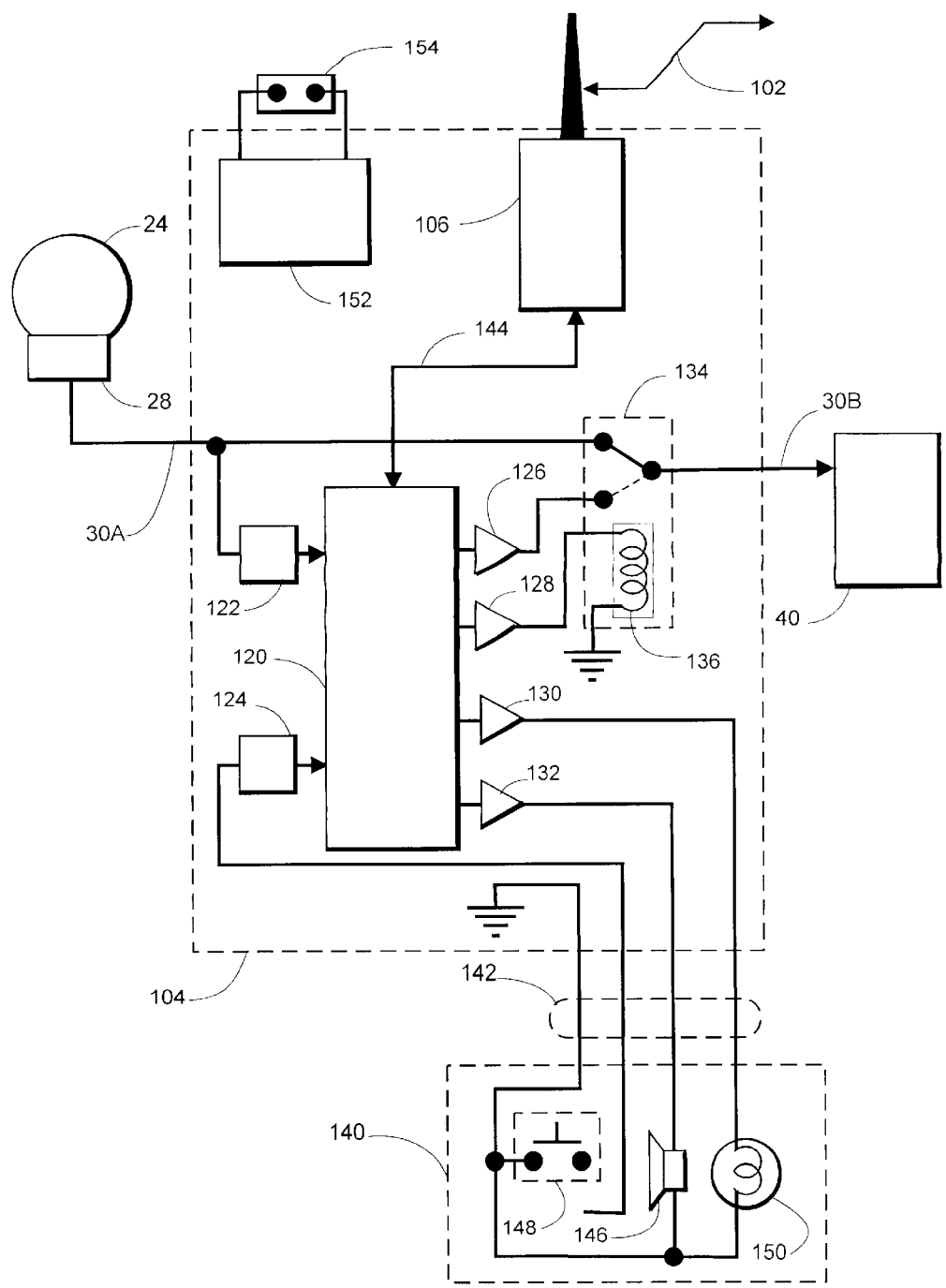
FIG. 3 is a simplified electronic schematic of the device for curtailing electric demand.

FIG. 3 is a simplified schematic of the preferred embodiment of the curtailment device 104 and the user alert accessory 140. Certain details that are conventional in designs of this nature have been omitted for clarity. A microcontroller 120 carries out the functions of curtailment device 104 according to a program stored in a non-volatile memory integral to microcontroller 120. Wireless transceiver 106 and microcontroller 120 communicate through a serial connection 144. Signal conditioning circuits 122 and 124 convert the incoming signals to a level compatible with microcontroller 120 and protect it against damaging electrical transients. It is good practice to buffer the digital outputs of microcontroller 120, so buffer circuits 126, 128, 130 and 132 have been included.

When coil 136 is in a de-energized state, relay 134 connects pulse output 28 to the KYZ pulse input of EMS 40. When coil 136 is in an energized state, relay 134 connects buffer circuit 126 to the KYZ pulse input of EMS 40.

A power supply 152 is connected to an alternating current source 154 and converts it to direct current at one or more regulated voltages so as to power transceiver 106, microcontroller 120, other electronic components within curtailment device 104, and user alert accessory 140.

Operation

Referring to the block diagram of FIG. 1, pulse output 28 transmits an electric pulse each time a predetermined quantity of energy is measured by electric meter 24. These pulses are commonly known in the electric utility industry as "KYZ" pulses. The rate at which pulse output 28 transmits the KYZ pulses corresponds to the electric demand measured by meter 24. Upon detecting a pulse rate higher than a predetermined threshold, EMS 40 responds by de-energizing, or reducing the energy consumption of one or more of the controlled electric end-use devices 42, thereby limiting the electric demand upon electric meter 24 and upon electric grid 20.

Referring to the block diagram of FIG. 2, curtailment device 104 is transparent to KYZ pulses when no curtailment is taking place, and the pulses pass directly from pulse output 28 to the pulse input of EMS 40. To initiate a curtailment, an appropriate command is composed on command computer 100 and sent to a wireless service provider through Internet 48.The command contains a unique address that the wireless service provider routes to the cellular station 50 that is within communication range of the particular wireless transceiver 106 in the premises to be curtailed. Cellular station 50 broadcasts the command, as well as timekeeping data. Wireless transceiver 106 processes and stores only those commands that encode the unique address of that particular transceiver. At frequent intervals microcontroller 120 queries transceiver 106 and downloads any command received, along with the current date and time of day. The command encodes a curtailment level, that is, a percentage demand reduction from the baseline demand. The command may also encode a schedule so that the curtailment can be started and ended at some specified later times.

Referring to the simplified electronic schematic of FIG. 3, microcontroller 120 continuously monitors the KYZ pulses coming through input pulse signal connection 30A, and calculates a running average of the demand measured by electric meter 24, which shall be called the "baseline demand". When executing a curtailment command, the microcontroller carries out the following steps:

a. Calculates a biased demand level that is higher than the baseline demand level
  b. Begins sending a demand signal representing the biased demand level through buffer circuit 126
  c. Energizes coil 136, activating relay 134, so that the biased signal is sent to EMS 40.

EMS 40 is programmed with a demand limit. Upon detecting the higher demand level of the biased signal, EMS will respond by shedding certain of the electric end-use devices 42 or reducing their individual demand, thereby reducing the demand upon electric meter 24 and electric grid 20.

Figure 4A:
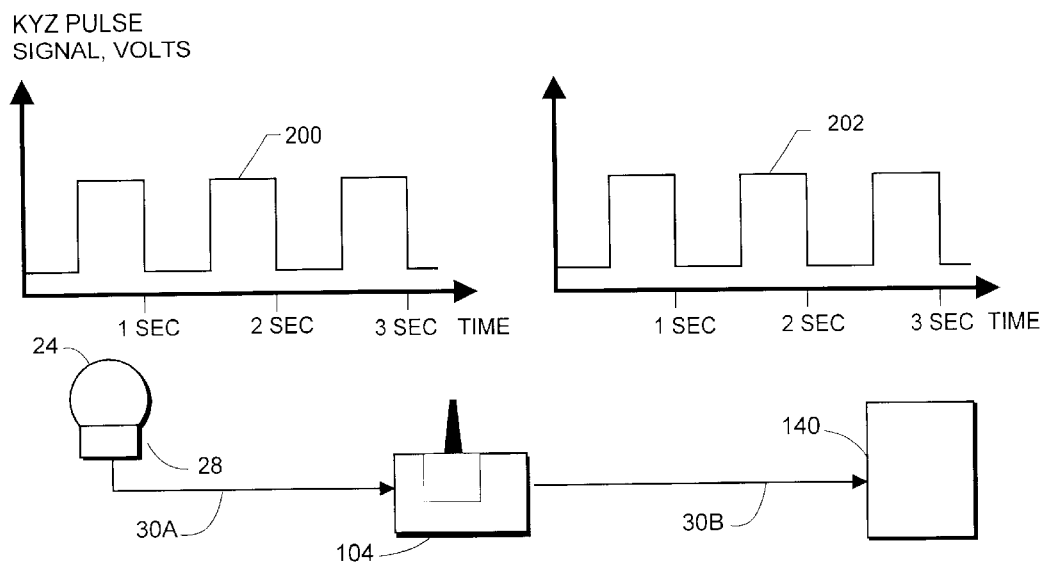
FIG. 4A shows the patterns of KYZ (metering) pulses when a curtailment is not taking place.

FIG. 4A shows a KYZ pulse waveform 200 in input pulse signal connection 30A and a KYZ pulse waveform 202 in the output signal pulse connection 30B when a curtailment is not underway. The waveforms are, in fact, identical because relay 134 connects input and output pulse signal connections 30A and 30B.

Figure 4B:
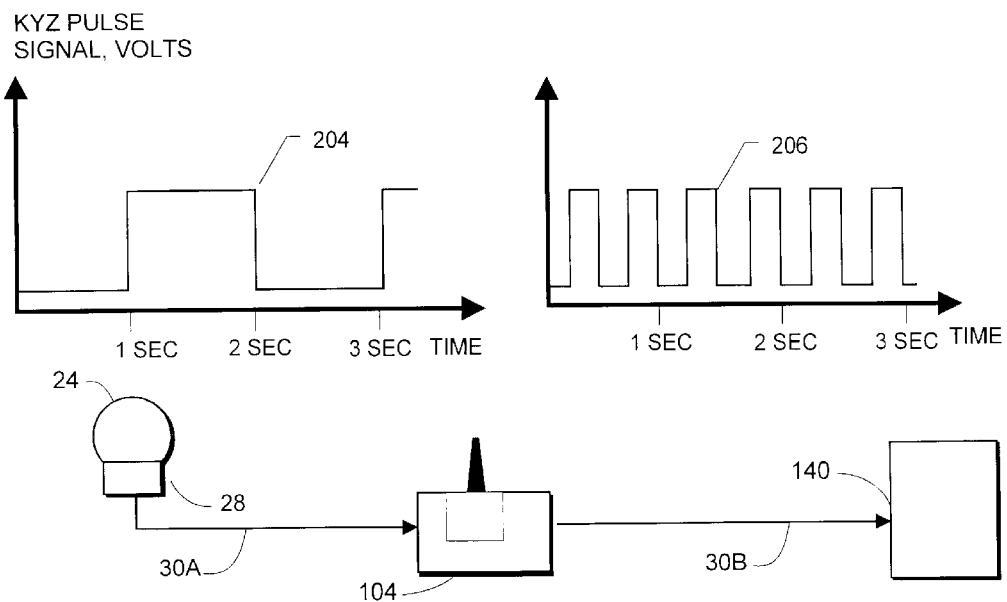
FIG. 4B shows the patterns of KYZ pulses when the device for curtailing electric demand is causing a curtailment.

FIG. 4B shows KYZ pulse waveforms during a curtailment. Microcontroller 120 has biased the frequency upward and sent waveform 206 to EMS 40. EMS 40 has responded by reducing the demand, and meter sends a waveform 204 of lower frequency, that is, representing a reduced demand.

Figure 5:
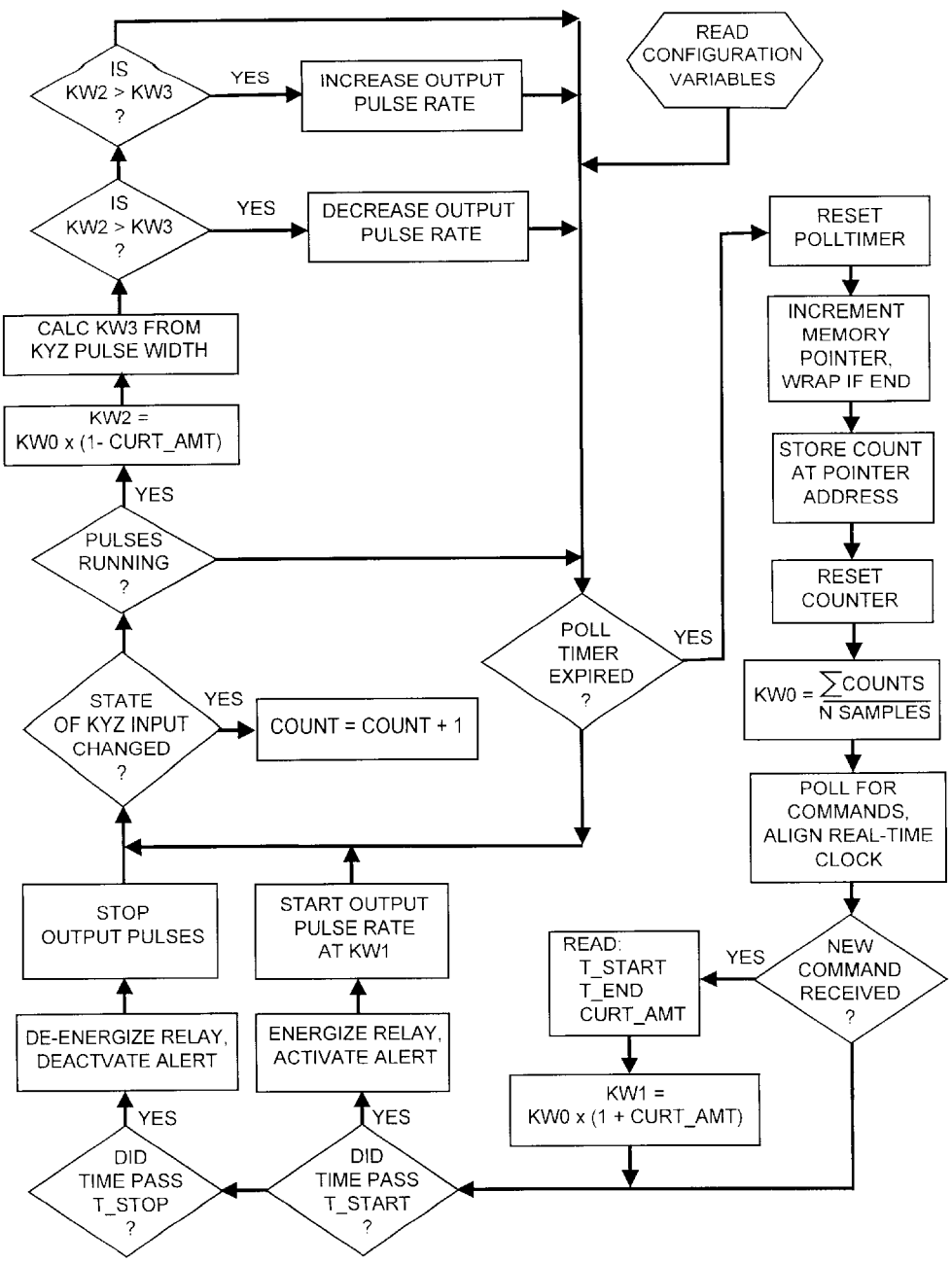
FIG. 5 shows an exemplary flowchart of the software that performs the functions contemplated for the device for curtailing electric demand.

FIG. 5 is a representative flowchart of the program running in the microcontroller 120. When a curtailment is not underway, the program circulates in the loop containing the blocks labeled "poll timer expired?" and "state of KYZ input changed?" At intervals, the program stores recorded pulses in a revolving series of memory registers and divides by the number of registers to compute a value that represents running average electric demand KW0. The upper case Greek letter sigma in the equation for KW0 means "sum of". The curtailment command contains a curtailment amount CURT_AMT, expressed as a decimal value, as well as the start and stop times of the curtailment. When microcontroller 120 begins executing a curtailment command, it immediately increases the pulse rate to a value corresponding to KW1. Microcontroller 120 then continues to monitor the real-time demand KW3 and adjusts the pulse rate until the demand on electric meter 24 is stabilizes at or near a demand target of KW2.

DESCRIPTION—ALTERNATIVE EMBODIMENTS

The description that follows is intended to be exemplary, and not limiting. Referring to simplified schematic FIG. 3, wireless transceiver 106 of the preferred embodiment of the device for curtailing electric demand is relatively expensive, and the user incurs periodic charges for wireless service. Certain customers that might install the device for curtailing electric demand have wireline or optical network connections. If so, wireless transceiver 106 could be replaced by an interface to a wireline or optical network.

Instead of having pulse output 28, electric meter 24 may provide a demand signal in the form of an analog output or as serial data. In the case of an analog output meter, an analog-to-digital converter would replace the first signal conditioning circuit 122. Also, a digital-to-analog converter and a driver circuit would replace buffer circuit 126.

If electric meter 24 sends a demand signal in the form of serial data, the first signal conditioning circuit 122 would take the form of a serial port, which reads the data. Microcontroller 120 would then decipher the data into a numeric representation of demand, calculate the required biased demand, and convert the biased demand to serial data of the proper format. Buffer circuit 126 would take the form of a second serial port, which would then transmit the biased demand to EMS 40.

Since a curtailment event may have certain operational impacts upon premises 70, and it may be desirable to notify the operating staff when a curtailment event is taking place. For this purpose, the device for curtailing electric demand can include a user alert accessory 140, located where it can be seen and heard. In this case, microcontroller 120 will, upon executing a curtailment command, activate buffer circuits 130 and 132, energizing audible alarm 146 and lamp 150 respectively, causing user alert accessory 140 to audibly and visually alert the operating staff. If a member of the operating staff depresses pushbutton 148 while the user alert accessory is activated, the microcontroller 40 will deactivate output buffer 132, thereby silencing audible alert 146 for the remainder of the curtailment.

I claim:

1. A device for curtailing electric demand, comprising:

a. an interface to a communications network through which said device receives curtailment commands sent from one or a plurality of remote locations, b. an input circuit that continuously monitors a demand signal sent by an electric meter and received by an energy management system, which demand signal represents electric demand being measured by said electric meter, and which energy management system is operatively connected to one or a plurality of electric end-use devices, c. an output circuit that produces a biased signal which represents an electric demand that is different than that represented by said demand signal, d. a switching component which, when activated, causes said energy management system to receive said biased signal instead of said demand signal, and e. a microcontroller which, when executing said curtailment command, activates said switching component, and further causes said output circuit to produce said biased signal that represents an electric demand higher than that of said demand signal and of sufficient level to cause said energy management system to control said electric end-use devices so as to curtail the electric demand upon said meter, and wherein said microcontroller, upon ending said curtailment, deactivates said switching component, thereby causing said energy management system to again receive said demand signal, and ending the curtailment.

2. The device for curtailing electric demand of claim 1 further including a user alert accessory, comprising:

a. a component capable of emitting an audible alarm, a component capable of emitting a visual alarm, or both, and a pushbutton switch that, when depressed, silences said audible alarm until said curtailment is concluded.

3. The device for curtailing electric demand of claim 1 wherein said device is capable of being programmed to respond simultaneously with a multitude of similar devices in diverse locations, when all said devices receive said a curtailment command of an appropriate conformation.

* * * * *